(12) United States Patent
Solodky et al.

(10) Patent No.: US 11,249,165 B2
(45) Date of Patent: Feb. 15, 2022

(54) HYPERBOLIC WAVEFORM FOR CODE-DIVISION MULTIPLE-ACCESS MULTIPLE-INPUT MULTIPLE-OUTPUT RADAR

(71) Applicant: GM GLOBAL TECHNOLOGY OPERATIONS LLC, Detroit, MI (US)

(72) Inventors: Gaston Solodky, Haifa (IL); Oren Longman, Tel Aviv (IL); Shahar Villeval, Tel Aviv (IL); Igal Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 16/529,158

(22) Filed: Aug. 1, 2019

(65) Prior Publication Data

US 2021/0033691 A1  Feb. 4, 2021

(51) Int. Cl.
*G01S 1/24* (2006.01)
*G01S 13/931* (2020.01)
(Continued)

(52) U.S. Cl.
CPC ........ *G01S 1/24* (2013.01); *G01S 7/42* (2013.01); *G01S 13/931* (2013.01); *H04B 7/0413* (2013.01)

(58) Field of Classification Search
CPC . G01S 1/24; G01S 7/42; G01S 13/931; H04B 7/0413
See application file for complete search history.

(56) References Cited

U.S. PATENT DOCUMENTS 9,730,219 B2 *  8/2017  Rambach .............. G01S 13/931
10,805,022 B2 * 10/2020  Shan .................... H04L 5/0048
(Continued)

OTHER PUBLICATIONS

"Yang, J. and T. Sarkar. "Doppler-invariant property of hyperbolic frequency modulated waveforms." Microwave and Optical Technology Letters 48 (2006): 1174-1179." (Year: 2006).*
(Continued)

*Primary Examiner* — Erin F Heard
*Assistant Examiner* — Taher Al Sharabati
(74) *Attorney, Agent, or Firm* — Quinn IP Law (57) ABSTRACT

A hyperbolic waveform multiple-input multiple-output radar includes a generator circuit, multiple transmit circuits, a multiple-input multiple-output antenna, and multiple receive circuits. The generator circuit may be operable to generate a linear frequency modulated signal and a hyperbolic frequency modulated signal. The transmit circuits may be operable to generate multiple transmit signals by analog mixing the linear frequency modulated signal and the hyperbolic frequency modulated signal in response to a plurality of coding family parameters, wherein the transmit signals define an orthogonal family of waveforms. The multiple-input multiple-output antenna may be operable to transmit the transmit signals toward an object and receive multiple receive signals from the object. The receive circuits may be operable to determine multiple data signals in response to the receive signals, wherein the data signals are suitable to determine a distance between the multiple-input multiple-output antenna and the object.

20 Claims, 3 Drawing Sheets

(51) Int. Cl.
G01S 7/42 (2006.01)
H04B 7/0413 (2017.01)

(56) References Cited

U.S. PATENT DOCUMENTS

| | | | | |
|---|---|---|---|---|
| 10,996,326 | B2* | 5/2021 | Solodky | G01S 13/931 |
| 2009/0325510 | A1* | 12/2009 | Pullela | H03D 7/1441 |
| | | | | 455/76 |
| 2014/0347211 | A1* | 11/2014 | Schoor | G01S 13/931 |
| | | | | 342/147 |
| 2019/0339382 | A1* | 11/2019 | Hess | G01S 13/42 |

OTHER PUBLICATIONS

"J. Yang • T. K. Sarkar, Acceleration-invariant pulse compression using hyperbolic frequency modulated waveforms, Jan. 1, 2006, IEEE Xplore, 2006 International Waveform Diversity & Design Conference, 2006, pp. 1-5, doi: 10.1109/WDD.2006.8321416." (Year: 2007).*

* cited by examiner

HYPERBOLIC WAVEFORM FOR CODE-DIVISION MULTIPLE-ACCESS MULTIPLE-INPUT MULTIPLE-OUTPUT RADAR

INTRODUCTION

Operations of multiple-input multiple-output (MIMO) radars involve transmission of multiple waveforms from multiple transmit antennas. Time-division multiple-access (TDMA) implementations of multiple-input multiple-output radars may be inefficient in terms of a transmission power and a maximum unambiguous Doppler. Other implementations of multiple-input multiple-output radars, such as code-division multiple-access (CDMA) schemes, may be more efficient than the TDMA-MIMO radars. However, existing multiple-input multiple-output radar implementations are generally complex, utilize high speed digital-to-analog converters and may have complex local oscillators schemes. A coding family with better cross-correlation properties oriented toward multiple-input multiple-output radar operation would be useful.

SUMMARY

A hyperbolic waveform multiple-input multiple-output radar is provided. The hyperbolic waveform multiple-input multiple-output radar comprises a generator circuit, a plurality of transmit circuits, a multiple-input multiple-output antenna and a plurality of receive circuits. The generator circuit is operable to generate a linear frequency modulated signal and a hyperbolic frequency modulated signal. The plurality of transmit circuits are coupled to the generator circuit and are operable to generate a plurality of transmit signals by analog mixing the linear frequency modulated signal and the hyperbolic frequency modulated signal in response to a plurality of coding family parameters, wherein the plurality of transmit signals define an orthogonal family of waveforms. The multiple-input multiple-output antenna is coupled to the plurality of transmit circuits and is operable to transmit the plurality of transmit signals toward an object and receive a plurality of receive signals from the object. The plurality of receive circuits are coupled to the multiple-input multiple-output antenna and are operable to determine a plurality of data signals in response to the plurality of receive signals, wherein the plurality of data signals are suitable to determine a distance between the multiple-input multiple-output antenna and the object.

In one or more embodiments, the orthogonal family of waveforms define a plurality of code-division multiple access codewords.

In one or more embodiments, the generator circuit and the plurality of transmit circuits are characterized by an absence of digital-to-analog converters.

In one or more embodiments, the hyperbolic waveform multiple-input multiple-output radar further comprises a radar processing unit coupled to the plurality of receive circuits and operable to determine the distance between the multiple-input multiple-output antenna and the object.

In one or more embodiments, each of the plurality of transmit circuits comprises a first frequency circuit configured to generate a weighted linear frequency modulated signal by frequency weighting or phase weighting the linear frequency modulated signal by a first coding family parameter of the plurality of coding family parameters, and the first coding family parameter has a value of unity or less.

In one or more embodiments, each of the plurality of transmit circuits comprises a second frequency circuit configured to generate a weighted hyperbolic frequency modulated signal by frequency weighting or phase weighting the hyperbolic frequency modulated signal by difference between unity and the value of the first coding family parameter.

In one or more embodiments, each of the plurality of transmit circuits further comprises an analog mixer circuit configured to generate an internal transmit signal by mixing the weighted linear frequency modulated signal and the weighted hyperbolic frequency modulated signal.

In one or more embodiments, each of the plurality of transmit circuits further comprises a frequency mixer circuit configured to generate one of the plurality of transmit signals by multiplying the internal transmit signal by a local oscillator signal.

In one or more embodiments, the multiple-input multiple-output antenna is mounted on a vehicle.

A method for range determination with a hyperbolic waveform multiple-input multiple-output radar is provided. The method includes generating a linear frequency modulated signal. The method includes generating a hyperbolic frequency modulated signal. The method further includes generating a plurality of transmit signals by analog mixing the linear frequency modulated signal and the hyperbolic frequency modulated signal in response to a plurality of coding family parameters using a plurality of analog circuits, wherein the plurality of transmit signals form an orthogonal family of waveforms. The method includes transmitting the plurality of transmit signals toward an object using a multiple-input multiple-output antenna. The method includes receiving a plurality of receive signals from the object. The method includes generating a plurality of data signals in response to the plurality of receive signals. The method further includes calculating a distance between the multiple-input multiple-output antenna and the object in response to the data signals.

In one or more embodiments, the orthogonal family of waveforms define a plurality of code-division multiple access codewords.

In one or more embodiments, the generation of the linear frequency modulation signal, the generation of the hyperbolic frequency modulation signal, and the generation of the plurality of transmit signals are characterized by an absence of digital-to-analog conversion.

In one or more embodiments, the generation of the plurality of transmit signals includes generating a plurality of weighted linear frequency modulated signals by frequency weighting or phase weighting the linear frequency modulated signal in response to the plurality of coding family parameters, and the plurality of coding family parameters have a plurality of values of unity or less.

In one or more embodiments, the generation of the plurality of transmit signals includes generating a plurality of weighted hyperbolic frequency modulated signals by frequency weighting or phase weighting the hyperbolic frequency modulated signal by a plurality of differences between unity and the plurality of values of the plurality of coding family parameters.

In one or more embodiments, the generation of the plurality of transmit signals includes generating a plurality of internal transmit signals by mixing the plurality of weighted linear frequency modulated signals and the plurality of weighted hyperbolic frequency modulated signals.

In one or more embodiments, the generation of the plurality of transmit signals includes multiplying the plurality of internal transmit signals by a local oscillator signal.

A vehicle is provided. The vehicle comprises a generator circuit, a plurality of transmit circuits, a multiple-input multiple-output antenna, and a plurality of receive circuits. The generator circuit is mounted to the vehicle and is operable to generate a linear frequency modulated signal and a hyperbolic frequency modulated signal. The plurality of transmit circuits are mounted to the vehicle and are operable to generate a plurality of transmit signals by analog mixing the linear frequency modulated signal and the hyperbolic frequency modulated signal in response to a plurality of coding family parameters, wherein the plurality of transmit signals define an orthogonal family of waveforms. The multiple-input multiple-output antenna is mounted to the vehicle and is operable to transmit the plurality of transmit signals toward an object and receive a plurality of receive signals from the object. The plurality of receive circuits are mounted to the vehicle and are operable to generate a plurality of data signals in response to the plurality of receive signals, wherein the plurality of data signals are suitable to determine a distance between the vehicle and the object.

In one or more embodiments, the orthogonal family of waveforms define a plurality of code-division multiple access codewords.

In one or more embodiments, the generator circuit and the plurality of transmit circuits are characterized by an absence of digital-to-analog converters.

In one or more embodiments, the vehicle further comprises a radar processing unit coupled to the plurality of receive circuits and operable to determine the distance between the multiple-input multiple-output antenna and the object.

The above features and advantages and other features and advantages of the present disclosure are readily apparent from the following detailed description of the best modes for carrying out the disclosure when taken in connection with the accompanying drawings.

DETAILED DESCRIPTION

Embodiments of the design generally provide orthogonal waveforms that provide efficient implementation of multiple-input multiple-output (MIMO) radars. A code-division multiple-access (CDMA) orthogonal signal family based on hyperbolic frequency modulation signals may be generated using analog circuitry. The orthogonal coding family may be implemented without utilizing high speed digital-to-analog converters and/or complex local oscillators schemes. The coding family generally provides a low cross-correlation property along with a high autocorrelation property suitable for applicability to multiple-input multiple-output radars. The resulting CDMA-MIMO scheme may be implemented by frequency modulation and/or phase modulation. Furthermore, a method to generate, transmit and receive the waveforms may be implemented.

In various embodiments, an automotive radar may be implement using a combination of linear frequency modulation (LFM) and hyperbolic frequency modulation (HFM). A waveform of a linear frequency modulated signal ($X_{LFM}$) may be provided by formula 1 as follows:

$$X_{LFM}(t) = e^{j\pi\alpha t^2} \tag{1}$$

Where $\alpha = B/T$ may be a chirp slope, B may be a signal bandwidth, and T may be a chirp duration.

A waveform of a hyperbolic frequency modulated signal ($X_{HFM}$) may be provided by formula 2 as follows:

$$X_{HFM}(t) = e^{j(2\pi/b)\ln(1+bf_1 t)} \tag{2}$$

Where $b = (f_1 - f_2)/(f_1 f_2 T)$, $f_1$ may be a chirp start frequency, $f_2$ may be a chirp stop frequency, and T may be the chirp duration. The hyperbolic frequency modulation is generally defined by a combination of the bandwidth ($f_1 - f_2$) and the chirp duration T. Both the linear frequency modulation and the hyperbolic frequency modulation may be implemented using solely low-complexity analog circuitry. Various embodiments may create an orthogonal signal family based on the linear frequency modulated signal $X_{LFM}$ and the hyperbolic frequency modulated signal $X_{HFM}$.

Figure 1:
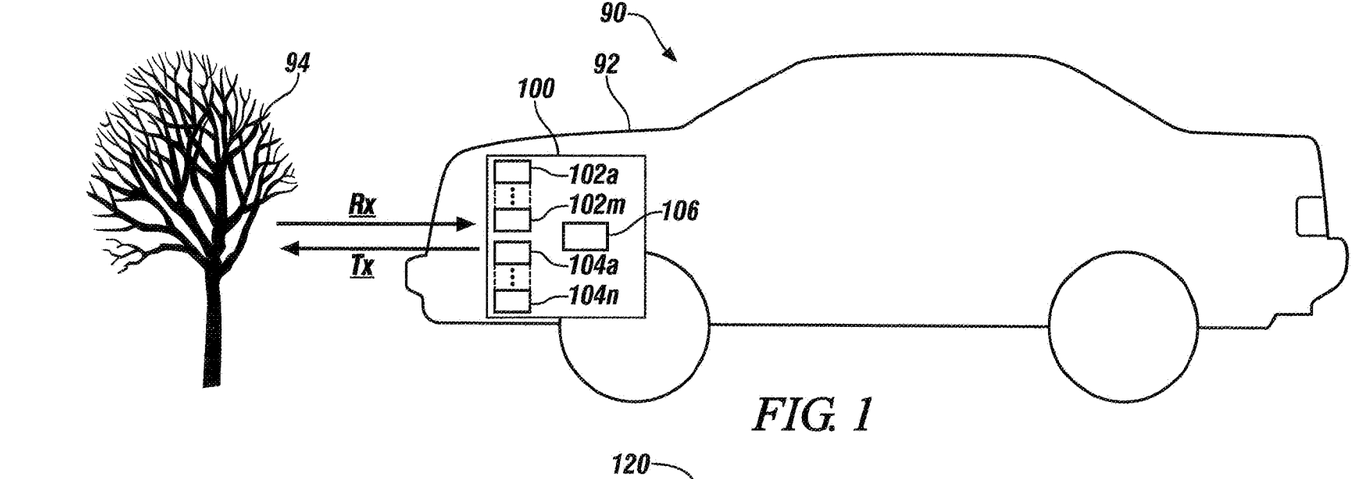
FIG. 1 is a schematic diagram illustrating a context of a system.

Referring to FIG. 1, a schematic diagram illustrating a context of a system 90 is shown. The system 90 may include a vehicle 92 and one or more objects 94 (one shown) outside the vehicle 92. The vehicle 92 generally comprises a multiple-input multiple-output radar 100. The multiple-input multiple-output radar 100 may include multiple transmit circuits 102a-102m, multiple receive circuits 104a-104n, and a radar processing unit 106.

A main transmit signal (Tx) may be generated and presented by the transmit circuits 102a-102m. The main transmit signal Tx generally comprises multiple transmit signals (or components), an individual transmit signal per transmit circuit 102a-102m. The main transmit signal Tx may convey radio-frequency signals carrying multiple codewords. The codewords may form an orthogonal family of codewords in a code-division multiple-access scheme. A main receive signal (Rx) may be received by the receive circuits 104a-104n. The main receive signal Rx generally comprises multiple receive signals, an individual receive signal for the transmit signals reflected (or returned) from the objects 94.

The vehicle 92 may include, but is not limited to, mobile vehicles (or objects) such as automobiles, trucks, motorcycles, boats, trains and/or aircraft. In some embodiments, the vehicle 92 may include stationary objects such as billboards, kiosks and/or marquees. Other types of vehicles 92 may be implemented to meet the design criteria of a particular application.

The objects 94 may include, but are not limited to, mobile objects (or targets) such as pedestrians, bicycles, carts, automobiles, trucks, motorcycles, boats, trains and/or aircraft. In some embodiments, the objects 94 may include stationary objects (or targets) such as signs, posts, buildings, mailboxes and/or walls. Other types of objects 94 capable of reflecting the main radar signal Tx may be implemented to meet the design criteria of a particular application.

The multiple-input multiple-output radar 100 may implement code-division multiple-access radar circuit. The multiple-input multiple-output radar 100 is generally operational to generate and transmit the main transmit signal Tx and receive the main receive signal Rx. The multiple-input multiple-output radar 100 may be further operational to utilize the codewords within the main receive signal Rx and the timing of the codewords to determine locations of, bearings to and/or Doppler shifts caused by the objects 94.

The transmit circuits 102a-102m may implement radar transmitter circuits (or transmit chains). The transmit circuits 102a-102m may collectively generate the main transmit signal Tx. The transmit circuits 102a-102m are generally operational to generate respective components of the main transmit signal Tx using unique mixtures of the linear frequency modulated signal XLFM and the hyperbolic frequency modulated signal XHFM.

The receive circuits 104a-104n may implement radar receiver circuits. The receive circuits 104a-104n may receive the components of the main transmit signal Tx returned by the objects 94. The receive circuits 104a-104n may utilize the orthogonal nature of the codewords in the main receive signal Rx to distinguish among the received components returned by the object 94.

The radar processing unit 106 may implement one or more computers (or processors). The radar processing unit 106 is generally operational to determine distances between the multiple-input multiple-output radar 100 and the objects 94, angular directions (e.g., azimuth bearings) to the objects 94 and/or Doppler shifts of the objects 94 in response to amplitude information and phase information received from the receive circuits 104a-104n.

Figure 2:
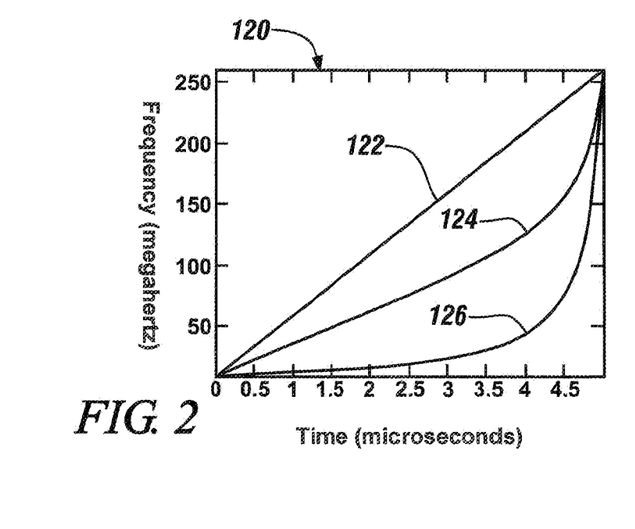
FIG. 2 is a graph of instantaneous frequencies for several frequency modulated signals in accordance with an exemplary embodiment.

Referring to FIG. 2, a graph 120 of instantaneous frequencies for several frequency modulated signals is shown in accordance with an exemplary embodiment. The x-axis (axis of abscissas) of the graph 120 generally represents time in units of microseconds. The y-axis (axis of ordinates) of the graph 120 generally represents frequency in units of megahertz. A linear curve 122 may illustrate the linear frequency modulated signal $X_{LFM}$ as a function of time. A hyperbolic curve 126 may illustrate the hyperbolic frequency modulated signal $X_{HFM}$ as a function of time. An intermediate curve 124 may illustrate an intermediate frequency modulated signal that is a combination of the linear frequency modulated signal $X_{LFM}$ and the hyperbolic frequency modulated signal $X_{HFM}$ as a function of time.

Different intermediate signals may be created by different mixtures of the linear frequency modulated signal $X_{LFM}$ and the hyperbolic frequency modulated signal $X_{HFM}$, the multiple intermediate signals may form a hyperbolic orthogonal signals family (HOSF(γ)). A waveform frequency f(t) in the hyperbolic orthogonal signals family may be defined by formula 3 as follows:

$$f(t)=fc+(\gamma\alpha t+\gamma\alpha bf_1 t^2+f_1-f_1\gamma)/1+bf_1 t), \gamma \in [0,1] \quad (3)$$

Where γ may be a coding family parameter in a set ranging from zero to unity, fc may be a carrier frequency, $f_1$ may be the chirp start frequency, $f_2$ may be the chirp stop frequency, t is time, α may be the slope, $b=(f^1-f_2)/(f_1 f_2 T)$ and T may be the chirp duration.

The hyperbolic orthogonal signals family may establish a coding family that achieves a high autocorrelation and a low cross-correlation among different values of the coding family parameter γ. The signal HOSF(γ=0) may be the hyperbolic frequency modulated signal $X_{HFM}$ (e.g., the hyperbolic curve 126). The signal HOSF(γ=1) may be the linear frequency modulated signal $X_{LFM}$ (e.g., the linear curve 122). The signal HOSF(γ=0.5) may be the intermediate frequency modulated signal (e.g., the intermediate curve 124). Other signals may be implemented within the hyperbolic orthogonal signals family using other values of the coding family parameter γ.

Figure 3:
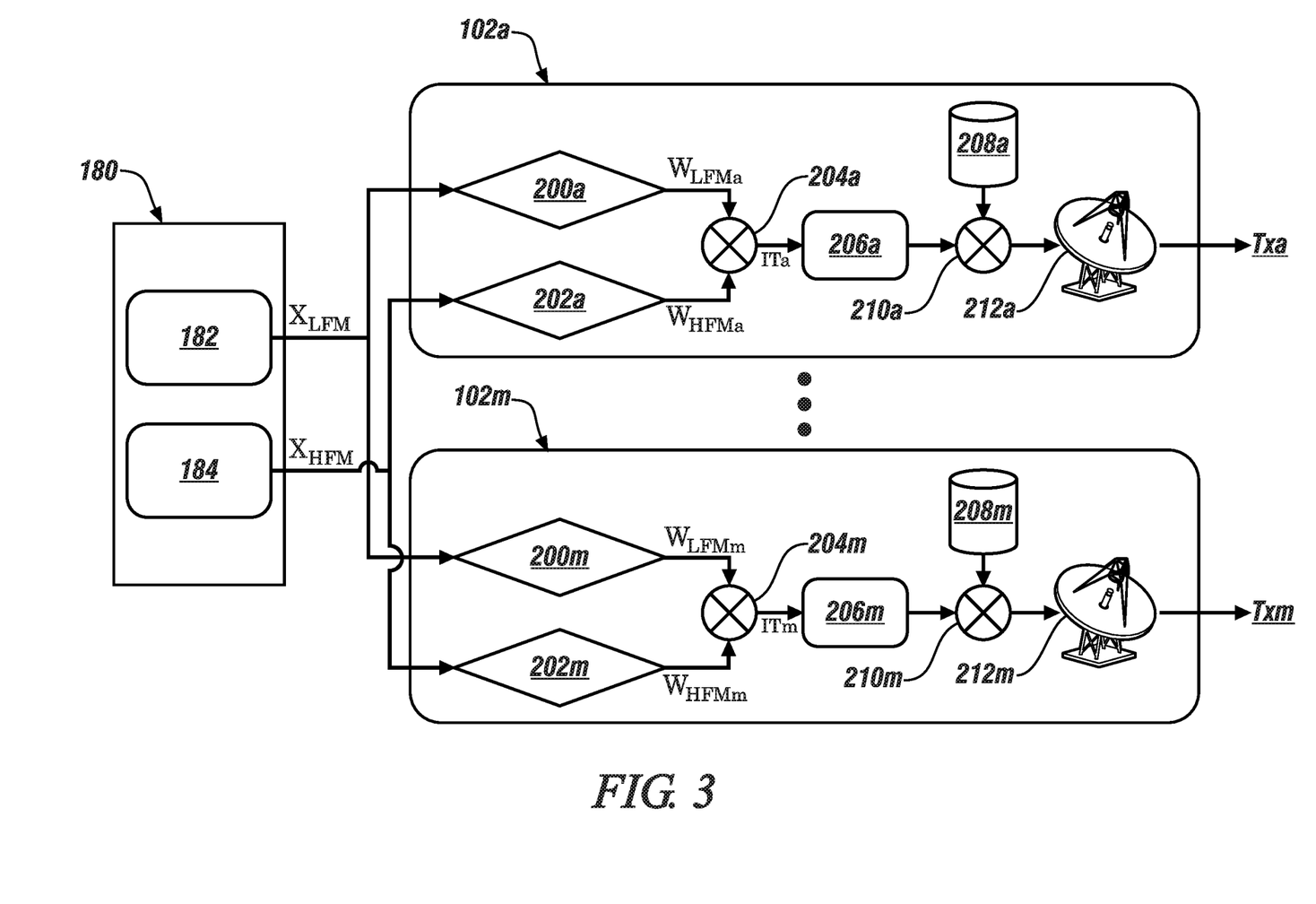
FIG. 3 is a schematic diagram of an implementation of a transmission portion of the multiple-input multiple-output radar in accordance with an exemplary embodiment.

Referring to FIG. 3, a schematic diagram of an implementation of a transmission portion of the multiple-input multiple-output radar 100 is shown in accordance with an exemplary embodiment. The transmission portion generally comprises a generator circuit 180 and the transmit circuits 102a-102m. The generator circuit 180 generally comprises a first analog synthesizer circuit 182 and a second analog synthesizer circuit 184. The transmit circuit 102a may include a first frequency circuit 200a, a second frequency circuit 202a, an analog mixer circuit 204a, a low pass filter circuit 206a, a local oscillator circuit 208a, a mixer circuit 210a and a transmit antenna 212a. The transmit circuits 102b-102m may be similar in design to the transmit circuit 102a. A combination of the transmit antennas 212a-212m may form a transmit portion of a multiple-input multiple-output antenna.

The linear frequency modulated signal XLFM may be generated by the first analog synthesizer circuit 182 and transferred to the first frequency circuits 200a-200m. The hyperbolic frequency modulated signal $X_{HFM}$ may be generated by the second analog synthesizer circuit 184 and transferred to the second frequency circuits 202a-202m. Multiple internal transmit signals (e.g., ITa-ITm) may be generated by the analog mixer circuits 204a-204m and presented to the low pass filter circuits 206a-206m. The transmit antennas 212a-212m may generate and broadcast multiple transmit signals Txa-Txm.

The first analog synthesizer circuit 182 may implement a linear frequency modulation generator circuit. The first analog synthesizer circuit 182 is generally operational to generate the linear frequency modulated signal $X_{LFM}$. In various embodiments, the first analog synthesizer circuit 182 may be implemented solely with analog circuitry. For example, the first analog synthesizer circuit 182 may be based upon a phase-locked loop circuit. Other types of analog-based linear frequency modulation circuits may be implemented to meet the design criteria of a particular application. The first analog synthesizer circuit 182 may be characterized by an absence (or a lack) of digital-to-analog converter circuits. (The first analog synthesizer circuit 182 may be implemented by a combination of digital and analog circuit as well.)

The second analog synthesizer circuit 184 may implement a hyperbolic frequency modulation generator circuit. The second analog synthesizer circuit 184 is generally operational to generate the hyperbolic frequency modulated signal $X_{HFM}$. Generation of the hyperbolic frequency modulated signal $X_{HFM}$ may be independent of the generation of the linear frequency modulation signal $X_{LFM}$. In various embodiments, the second analog synthesizer circuit 184 may be implemented solely with analog circuitry. (The second analog synthesizer circuit 184 may be implemented by a combination of digital and analog circuit as well.) The hyperbolic frequency modulated signal $X_{HFM}$ may be generated using a modified version of the first analog synthesizer circuit 182. For example, a phase-locked loop circuit may be modified to perform a hyperbolic frequency modulation instead of a linear frequency modulation. The second analog synthesizer circuit 184 may be characterized by an absence (or a lack) of digital-to-analog converter circuits. The orthogonal family of waveforms may be created by analog combinations of the two signals.

The first frequency circuits $200a$-$200m$ may implement frequency weighting circuits. The first frequency circuits $200a$-$200m$ are generally operational to weight (or adjust) a frequency (or a phase) of the linear frequency modulation signal $X_{LFM}$ by different values of the coding family parameters γ. The resulting signals may be referred to as weighted linear frequency modulated ($W_{LFMa}$-$W_{LFMm}$) signals. The weighted linear frequency modulated signals $WLFM_a$-$W_{LFMm}$ may be frequency (or phase) proportional to the linear frequency modulation signal $X_{LFM}$ as determined by the corresponding values of the coding family parameters γ.

The first frequency circuits $200a$-$200m$ may implemented with different values of the coding family parameters γ. In various embodiments, the first frequency circuit $200a$ may implement a coding family parameter value of zero (0). The first frequency circuit $200m$ may implement a coding family parameter value of unity (1). The first frequency circuits $200b$-$200l$ may implement unique coding family parameter values between zero and unity. The weighted linear frequency modulated signals $W_{LFMa}$-$W_{LFMm}$ may be frequency proportional to (or frequency multiplied by) the frequency of the linear frequency modulation signal $X_{LFM}$ as determined by the values of the coding family parameters γ (e.g., γa to γm).

The second frequency circuits $202a$-$202m$ may implement frequency weighting circuits. The second frequency circuits $202a$-$202m$ are generally operational to weight (or adjust) a frequency (or a phase) of the hyperbolic frequency modulation signal $X_{HFM}$ by differences between unity and the values of the coding family parameters γ. The resulting signals may be referred to as weighted hyperbolic frequency modulated signals ($W_{HFMa}$-$W_{HFMm}$). The weighted hyperbolic frequency modulated signals $W_{HFMa}$-$W_{HFMm}$ may be proportional to the frequency of the hyperbolic frequency modulation signal $X_{HFM}$ as determined by unity minus the different values of the coding family parameters γ.

The second frequency circuits $202a$-$202m$ may be implemented with different values of the coding family parameters γ. In various embodiments, the second frequency circuit $202a$ may implement the coding family parameter value of zero (0). The second frequency circuit $202m$ may implement the coding family parameter value of unity (1). The second frequency circuits $202b$-$202l$ may implement unique coding family parameter values between zero and unity. The weighted hyperbolic frequency modulated signals $W_{HFMa}$-$W_{HFMm}$ may be proportional to (or multiplied by) the hyperbolic frequency modulation signal $X_{HFM}$ as determined by a difference between unity and the values of the coding family parameters γ (e.g., 1-γa to 1-γm).

The analog mixer circuits $204a$-$204m$ may implement a high-frequency mixers. The analog mixer circuits $204a$-$204m$ are generally operational to mix the weighted linear frequency modulated signals $W_{LFMa}$-$W_{LFMm}$ received from the first frequency circuits $200a$-$200m$ with the weighted hyperbolic frequency modulated signals $W_{HFMa}$-$W_{HFMm}$ received from the second frequency circuits $202a$-$202m$. The analog mixer circuits $204a$-$204m$ may generate the internal transmit signals ITa-ITm.

The low pass filter circuits $206a$-$206m$ may implement low-frequency pass circuits. The low pass filter circuits $206a$-$206m$ are generally operational to suppress or remove high-frequency modulations caused by operations in the analog mixer circuits $204a$-$204m$. The low pass filter circuits $206a$-$206m$ may pass the resulting codewords (e.g., the filtered internal transmit signals ITa-Tm) to the frequency mixer circuits $210a$-$210m$.

The local oscillator circuits $208a$-$208m$ may implement radio-frequency oscillator circuits. The local oscillator circuits $208a$-$208m$ are generally operational to generate local oscillator signals. The local oscillator signals may be presented to the frequency mixer circuits $210a$-$210m$. In various embodiments, the local oscillator signals may be generated independently of the other local oscillator signals. In some embodiments, the local oscillator signals may share a common carrier frequency. In other embodiments, the local oscillator signals may be copies of a one or a few local oscillator signals. In still other embodiments, the local oscillator signals may have different carrier frequencies.

The frequency mixer circuits $210a$-$210m$ may implement high-frequency mixers. The frequency mixer circuits $210a$-$210m$ are generally operational to generate radio-frequency signals by mixing (or multiplying) the filtered internal transmit signals ITa-ITm by the local oscillator signals to up convert the filtered internal transmit signal frequencies into a frequency band suitable for the radar applications. In various embodiments, the frequency mixer circuits $210a$-$210m$ may also amplify the radio-frequency signals to a specified power range for the radar applications.

The transmit antennas $212a$-$212m$ may implement radio-frequency transmission antennas. The transmission antennas $212a$-$212m$ may be operational to broadcast the radio-frequency signals as the transmit signals Txa-Txm. The transmission antennas $212a$-$212m$ may be spatially separated from each other such that the object 94 receives a transmit signal Txa-Txm from a different angle and/or at a different time. The transmit antennas $212a$-$212m$ may form a transmit portion of the multiple-input multiple-output antenna.

The transmit circuits $102a$-$102m$ may provide a low complexity implementation of hyperbolic orthogonal signals family coding/decoding. The coding may be performed via the frequency (or phase) alpha filtering of the linear frequency modulated signal $X_{LFM}$ and the hyperbolic frequency modulated signal $X_{HFM}$ in the first frequency circuits $200a$-$200m$ and the second frequency circuits $202a$-$202m$. A frequency (f(t)) of the resulting internal signals ITa-ITm may be expressed as a function of time t by formula 4 as follows:

$$f(t) = \gamma f_{LFM}(t) + (1-\gamma) f_{HFM}(t), \quad 0 \leq \gamma \leq 1 \tag{4}$$

Where $f_{LFM}(t)$ may be a frequency of the linear frequency modulated signal $X_{LFM}$ and $f_{HFM}(t)$ may be a frequency of the hyperbolic frequency modulated signal $X_{HFM}$.

A phase (φ(t)) of the resulting internal signals ITa-ITm may expressed as a function of time t by formula 5 as follow:

$$\varphi(t) = \gamma \varphi_{LFM}(t) + (1-\gamma) \varphi_{HFM}(t), \quad 0 \leq \gamma \leq 1 \tag{5}$$

Where $\varphi_{LFM}(t)$ may be a phase of the linear frequency modulated signal $X_{LFM}$ and $\varphi_{HFM}(t)$ may be a phase of the hyperbolic frequency modulated signal $X_{HFM}$.

The frequency modulated signals $X_{LFM}$ and $X_{HFM}$ may pass through the M transmit circuits $102a$-$102m$. In the $x^{th}$ transmit circuit $102x$, the linear frequency modulated signal $X_{LFM}$ may be weighted with the corresponding value of the coding family parameter γx in the first frequency circuit $200x$ and the hyperbolic frequency modulated signal $X_{HFM}$ may be weighted with (1-γx) in the second frequency circuit $202x$. The weighted signals may be mixed by the analog mixer circuit $204x$ and pass through the low pass filter circuit $206x$ to attenuate higher modulation frequencies caused by the mixing. The resulting codeword may be mixed with the desired carrier frequency (e.g., the local oscillator signal from the local oscillator circuit 208x) by the frequency mixer circuit 210x and transmitted by the transmit antenna 212x.

Figure 4:
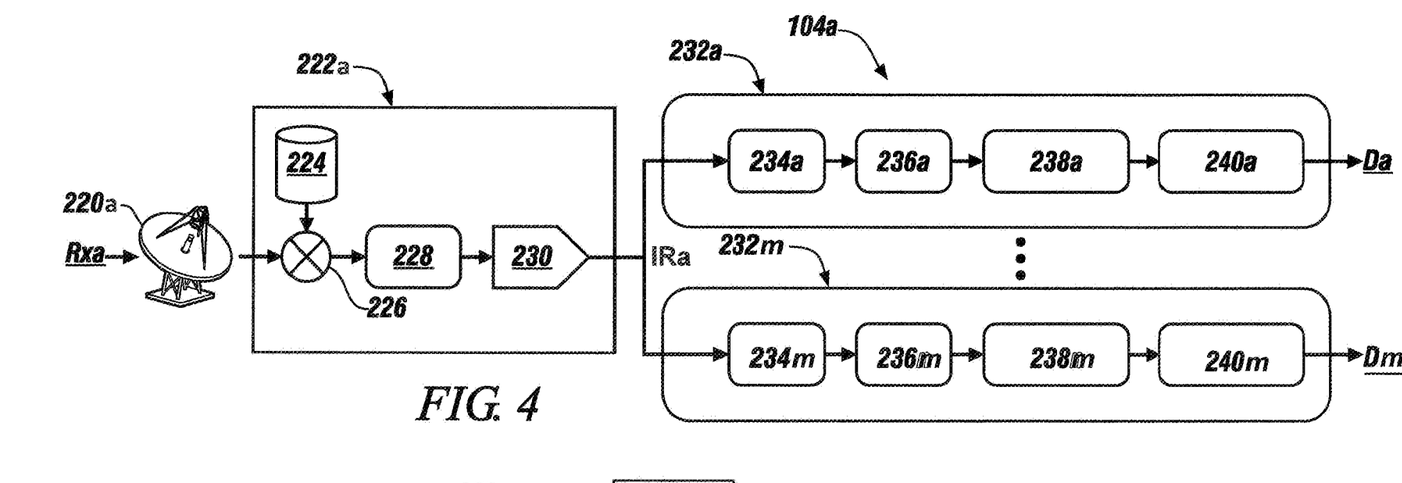
FIG. 4 is a schematic diagram of a receive portion of the multiple-input multiple-output radar in accordance with an exemplary embodiment.

Referring to FIG. 4, a schematic diagram of a receive portion of the multiple-input multiple-output radar 100 is shown in accordance with an exemplary embodiment. The receive portion may be representative of the receive circuits 104a-104n. By way of example, the receive circuit 104a generally comprises a receive antenna 220a, a receiver front end circuit 222a, and multiple receive chains 232a-232m. The receiver front end circuit 222a generally comprises a local oscillator circuit 224, a frequency mixer circuit 226, a low pass filter circuit 228 and an analog-to-digital converter circuit 230. The receive chains 232a-232m generally comprise digital match filter circuits 234a-234m, Doppler Fast Fourier transform (FFT) circuits 236a-236m, beam forming circuits 238a-238m and post processing circuits 240a-240m.

The receive circuits 104b-104n (see FIG. 1) may have similar implementations as the receive circuit 104a. The receive antenna 220a in the N receive circuits 104a-104n (e.g., the receive antennas 220a-220n) may implement a receive portion of the multiple-input multiple-output antenna (e.g., transmit antennas 212a-212m and receive antennas 220a-220n). The M receive chains 232a-232m in the N receive circuits 104a-104n may generate and present to the radar processing unit 106 at least N×M data signals D (e.g., data signal Da-Dm from the receive circuit 104a shown for simplicity).

The receive signal Rxa may be received by the receive antenna 220a. An internal receive signal (IRa) may be generated by the receiver front end circuit 222a and presented to the receive chains 232a-232m. The post processing circuits 240a-240m may generate and present the data signals Da-Dm to the radar processing unit 106.

The receive antenna 220a may implement a radio-frequency receive antenna. The receive antenna 220a may be operational to convert the receive signal Rxa into an electrical signal. The receive antennas 220a-220n may be spatially separated from each other such that the receive signals Rxa-Rxn from the object 94 are received at different angles and/or different times.

The local oscillator circuit 224 may implement radio-frequency oscillator circuit. The local oscillator circuit 224 is generally operational to generate a local oscillator signal. The local oscillator signal may be presented to the frequency mixer circuits 226. In various embodiments, the local oscillator signals in the receiver front end circuits 222a-222n may be generated independently of the other local oscillator signals. In various embodiments, the local oscillator signals may share a common frequency. In other embodiments, the local oscillator signals may be copies of a one or a few local oscillator signals. In still other embodiments, the local oscillator signals may have different frequencies.

The frequency mixer circuit 226 may implement a high-frequency mixer. The frequency mixer circuit 226 is generally operational to generate an intermediate-frequency signal by mixing (or multiplying) the receive signal Rxa by the local oscillator signal to down convert the receive signal frequency into an intermediate frequency band suitable for digital processing.

The low pass filter circuit 228 may implement an anti-aliasing low frequency pass circuit. The low pass filter circuit 228 is generally operational to suppress or remove high-frequency modulations caused by operations in the frequency mixer circuit 226. The low pass filter circuit 228 may pass the resulting intermediate-frequency signal to the analog-to-digital converter circuit 230.

The analog-to-digital converter circuit 230 may implement a high-speed converter circuit. The analog-to-digital converter circuit 230 is generally operational to convert the intermediate signal received from the low pass filter circuit 228 from an analog domain to a digital domain. The conversion to the digital domain may be a multiple-bit (e.g., 4-bit to 10-bit) digitization. The resulting internal receive signal IRa may be presented in parallel to the digital match filter circuits 234a-234m.

The digital match filter circuits 234a-234m may implement standard match filter circuits. The digital match filter circuits 234a-234m are generally operational to identify and pass or block the codewords in the digital internal receive signal IRa based on the coding family parameters γ. The digital match filter circuits 234a-234m may implement a unique one of the coding family parameters γ. Generally, the unique coding family parameters γ implemented in the digital match filters 234a-234m may be the same as the unique coding family parameters γ implemented in the first power circuits 200a-200m. The codewords that match the unique coding family parameters γ may be passed on to the Doppler Fast Fourier transform circuits 236a-236m. The codewords that do not match the unique coding family parameters y may be discarded (or blocked). Therefore, the M receive chains 232a-232m may each select and process a respective one of the M codewords generated by the transmit circuits 102a-102m.

The Doppler Fast Fourier transform circuits 236a-236m may implement standard transform circuits. The Doppler Fast Fourier transform circuits 236a-236m are generally operational to transform the codewords from the time domain into the frequency domain. The resulting transformation information may be presented to the beam forming circuits 238a-238m.

The beam forming circuits 238a-238m may implement standard beam forming circuits. The beam forming circuits 238a-238m are generally operational to determine an amplitude and a phase conveyed by the transformation information. The amplitude information and phase information may be presented to the post processing circuits 240a-240m.

The post processing circuits 240a-240m may implement standard processing circuits. The post processing circuits 240a-240m are generally operational to generate the data signals Da-Dm in response to the amplitude information and phase information received from the beam forming circuits 238a-238m.

The receive antennas 220a-220n and corresponding receiver front end circuits 222a-222n may be coupled to N×M receive chains 232a-232m, a receive chain per codeword per receive circuit. After down conversion, anti-aliasing low-pass filtering and sampling in the receiver front end circuits 222a-222n, the digital internal signals IRa-IRn may be processed by the receive chains 232a-232m associated with the receive circuits 104a-104n. The receive chains 232a-232m may contain the digital match filter circuits 234a-234m, the Doppler Fast Fourier transform circuits 236a-236m, the beam forming circuits 238a-238m and the post processing circuits 240a-240m, respectively.

Selection of several different parameter values for the coding family parameter y for different codewords generally allows creation of a coding family. In various embodiments, an iterative approach may be used. The selection criterion may be based on the autocorrelation peak and the average cross-correlation peak of the codewords.

Creation of the coding family may begin with an addition of an initial coding family parameter value (e.g., γ=1) in a null set (or group) of values. A codeword loop may find possible candidates where a cross-correlation peak with the found codewords is under a predefined threshold. If one or more codewords are found, the candidate codeword closest to the codeword values in the set the coding family parameter values may be added to the set. Where multiple candidate codewords are found, the closest coding family parameter value ($\gamma_m$) may be determined by formula 6 as follows:

$$\gamma_m = \underset{\gamma_m}{\mathrm{argmin}} \sum_{m'=0}^{m-1} |\gamma_{m'} - \gamma_m| \qquad (6)$$

If a candidate codeword is not found, the threshold may be raised. The loop may be repeated until a specified number of family parameter values are found.

Figure 5:
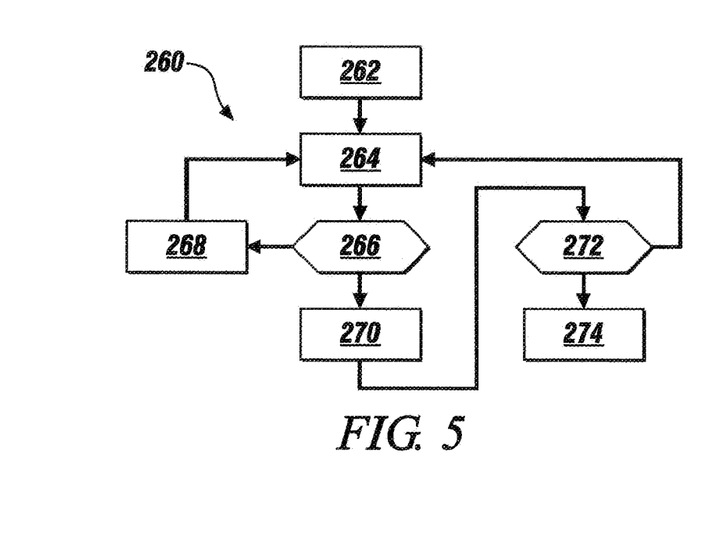
FIG. 5 is a flow diagram of a method for selection of the coding family parameter values for orthogonal codewords in accordance with an exemplary embodiment.

Referring to FIG. 5, a flow diagram of a method 260 for selection of the coding family parameter values for orthogonal codewords is shown in accordance with an exemplary embodiment. The method (or process) 260 may be implemented as software executing on a standard computer. The method 260 generally comprises a step (or state) 262, a step (or state) 264, a step (or state) 266, a step (or state) 268, a step (or state) 270, a step (or state) 272, and a step (or state) 274. The sequence of steps 262 to 274 is shown as a representative example. Other step orders may be implemented to meet the criteria of a particular application.

In step 262, the group may be initiated with an initial member. For example, a first codeword may be set to a value (e.g., $\gamma=0.5$) with a specified range (e.g., $0 \leq \gamma \leq 1$). A search may be performed in step 264 to find codewords that meet a cross-correlation threshold with already selected codewords in the group. In particular, the search may seek the codewords ($\gamma$all) whose maximal cross-correlation with the already selected codewords meets the cross-correlation threshold. Meeting the cross-correlation threshold may be defined by formula 7 as follows:

$$\gamma_{all} = \underset{\gamma}{\mathrm{argmax}}[\mathrm{xcorr}\{Codeword_{\gamma_{0:l-1}}, Codeword_{\gamma_l}\}] \qquad (7)$$

A check may be performed at step 266 to determine if additional codewords exist that meet the cross-correlation threshold. If no additional codewords exist that meet the cross-correlation threshold, the cross-correlation threshold may be increased by factor $\varepsilon$ in step 268 The method 260 may subsequently return to step 264 and search for additional members.

After at least one additional codeword has been found, the codewords whose value of $\gamma$ is the closest to the already selected codewords may be selected in step 270 and added to the group. The closest codeword $\gamma_l$ may be determined by formula 8 as follows:

$$\gamma_l = \underset{\gamma_l}{\mathrm{argmin}}|\gamma_{all} - \gamma_{0:l-1}| \qquad (8)$$

A check is generally performed in step 272 to determine if a group size has been reached. If the number of codewords in the group is less than a size threshold, the method 260 may return to step 264 and search for additional members. Once the number of codewords in the group meets or exceeds the size threshold, the method 260 may stop in step 274.

In various embodiments, the hyperbolic orthogonal signals family may enable orthogonal waveforms for CDMA-MIMO radar at low hardware complexity and low computational complexity. Use of the hyperbolic orthogonal signals family generally enables enhanced detection range, maximum unambiguous Doppler and/or direction of arrival (DOA) accuracy. Generation of the orthogonal waveforms may be achieved without the use of digital-to-analog converters.

While the best modes for carrying out the disclosure have been described in detail, those familiar with the art to which this disclosure relates will recognize various alternative designs and embodiments for practicing the disclosure within the scope of the appended claims.

What is claimed is:

1. A hyperbolic waveform multiple-input multiple-output radar comprising:
   a generator circuit operable to generate a linear frequency modulated signal and a hyperbolic frequency modulated signal;
   a plurality of transmit circuits coupled to the generator circuit and operable to generate a plurality of transmit signals by analog mixing the linear frequency modulated signal and the hyperbolic frequency modulated signal in response to a plurality of coding family parameters, wherein the plurality of transmit signals define an orthogonal family of waveforms;
   a multiple-input multiple-output antenna coupled to the plurality of transmit circuits and operable to transmit the plurality of transmit signals toward an object and receive a plurality of receive signals from the object; and
   a plurality of receive circuits coupled to the multiple-input multiple-output antenna and operable to determine a plurality of data signals in response to the plurality of coding family parameters within the plurality of receive signals, wherein the plurality of data signals are suitable to determine a distance between the multiple-input multiple-output antenna and the object.

2. The hyperbolic waveform multiple-input multiple-output radar according to claim 1, wherein the orthogonal family of waveforms define a plurality of code-division multiple access codewords.

3. The hyperbolic waveform multiple-input multiple-output radar according to claim 1, wherein the generator circuit and the plurality of transmit circuits are characterized by an absence of digital-to-analog converters.

4. The hyperbolic waveform multiple-input multiple-output radar according to claim 1, further comprising a radar processing unit coupled to the plurality of receive circuits and operable to determine the distance between the multiple-input multiple-output antenna and the object.

5. The hyperbolic waveform multiple-input multiple-output radar according to claim 1, wherein each of the plurality of transmit circuits comprises a first frequency circuit configured to generate a weighted linear frequency modulated signal by frequency weighting or phase weighting the linear frequency modulated signal by a first coding family parameter of the plurality of coding family parameters, and the first coding family parameter has a value of unity or less.

6. The hyperbolic waveform multiple-input multiple-output radar according to claim 5, wherein each of the plurality of transmit circuits comprises a second frequency circuit configured to generate a weighted hyperbolic frequency modulated signal by frequency weighting or phase weighting the hyperbolic frequency modulated signal by difference between unity and the value of the first coding family parameter.

7. The hyperbolic waveform multiple-input multiple-output radar according to claim 6, wherein each of the plurality of transmit circuits further comprises an analog mixer circuit configured to generate an internal transmit signal by mixing the weighted linear frequency modulated signal and the weighted hyperbolic frequency modulated signal.

8. The hyperbolic waveform multiple-input multiple-output radar according to claim 7, wherein each of the plurality of transmit circuits further comprising a frequency mixer circuit configured to generate one of the plurality of transmit signals by multiplying the internal transmit signal by a local oscillator signal.

9. The hyperbolic waveform multiple-input multiple-output radar according to claim 1, wherein the multiple-input multiple-output antenna is mounted on a vehicle.

10. A method for range determination with a hyperbolic waveform multiple-input multiple-output radar, comprising:
generating a linear frequency modulated signal;
generating a hyperbolic frequency modulated signal;
generating a plurality of transmit signals by analog mixing the linear frequency modulated signal and the hyperbolic frequency modulated signal in response to a plurality of coding family parameters using a plurality of analog circuits, wherein the plurality of transmit signals form an orthogonal family of waveforms;
transmitting the plurality of transmit signals toward an object using a multiple-input multiple-output antenna;
receiving a plurality of receive signals from the object;
generating a plurality of data signals in response to the plurality of coding family parameters within the plurality of receive signals; and
calculating a distance between the multiple-input multiple-output antenna and the object in response to the data signals.

11. The method according to claim 10, wherein the orthogonal family of waveforms define a plurality of code-division multiple access codewords.

12. The method according to claim 10, wherein the generation of the linear frequency modulation signal, the generation of the hyperbolic frequency modulation signal, and the generation of the plurality of transmit signals are characterized by an absence of digital-to-analog conversion.

13. The method according to claim 10, wherein the generation of the plurality of transmit signals includes generating a plurality of weighted linear frequency modulated signals by frequency weighting or phase weighting the linear frequency modulated signal in response to the plurality of coding family parameters, and the plurality of coding family parameters have a plurality of values of unity or less.

14. The method according to claim 13, wherein the generation of the plurality of transmit signals includes generating a plurality of weighted hyperbolic frequency modulated signals by frequency weighting or phase weighting the hyperbolic frequency modulated signal by a plurality of differences between unity and the plurality of values of the plurality of coding family parameters.

15. The method according to claim 14, wherein the generation of the plurality of transmit signals includes generating a plurality of internal transmit signals by mixing the plurality of weighted linear frequency modulated signals and the plurality of weighted hyperbolic frequency modulated signals.

16. The method according to claim 15, wherein the generation of the plurality of transmit signals includes multiplying the plurality of internal transmit signals by a local oscillator signal.

17. A vehicle comprising:
a generator circuit mounted to the vehicle and operable to generate a linear frequency modulated signal and a hyperbolic frequency modulated signal;
a plurality of transmit circuits mounted to the vehicle and operable to generate a plurality of transmit signals by analog mixing the linear frequency modulated signal and the hyperbolic frequency modulated signal in response to a plurality of coding family parameters, wherein the plurality of transmit signals define an orthogonal family of waveforms;
a multiple-input multiple-output antenna mounted to the vehicle and operable to transmit the plurality of transmit signals toward an object and receive a plurality of receive signals from the object; and
a plurality of receive circuits mounted to the vehicle and operable to generate a plurality of data signals in response to the plurality of coding family parameters within the plurality of receive signals, wherein the plurality of data signals are suitable to determine a distance between the vehicle and the object.

18. The vehicle according to claim 17, wherein the orthogonal family of waveforms define a plurality of code-division multiple access codewords.

19. The vehicle according to claim 17, wherein the generator circuit and the plurality of transmit circuits are characterized by an absence of digital-to-analog converters.

20. The vehicle according to claim 17, further comprising a radar processing unit coupled to the plurality of receive circuits and operable to determine the distance between the vehicle and the object.

* * * * *